US011197796B2

(12) United States Patent
Johnson

(10) Patent No.: US 11,197,796 B2
(45) Date of Patent: Dec. 14, 2021

(54) MOBILE UPPER EXTREMITY (UE) SUPPORTS FOR USE IN RAILED ENVIRONMENTS

(71) Applicant: NeuroMobility, LLC, Coupeville, WA (US)

(72) Inventor: Cynthia Louise Johnson, Coupeville, WA (US)

(73) Assignee: NeuroMobility, LLC, Coupeville, WA (US)

( * ) Notice: Subject to any disclaimer, the term of this patent is extended or adjusted under 35 U.S.C. 154(b) by 0 days.

(21) Appl. No.: 16/847,459

(22) Filed: Apr. 13, 2020

(65) Prior Publication Data

US 2020/0237601 A1 Jul. 30, 2020

Related U.S. Application Data

(63) Continuation-in-part of application No. 15/835,062, filed on Dec. 7, 2017, now Pat. No. 10,617,907, and a continuation-in-part of application No. PCT/US2016/060411, filed on Nov. 3, 2016.

(60) Provisional application No. 62/431,131, filed on Dec. 7, 2016, provisional application No. 62/250,291, filed on Nov. 3, 2015.

(51) Int. Cl.
*F16M 11/00* (2006.01)
*A61H 3/00* (2006.01)
*A63B 21/00* (2006.01)
*A63B 22/00* (2006.01)
*A63B 3/00* (2006.01)

(52) U.S. Cl.
CPC ......... *A61H 3/008* (2013.01); *A63B 21/4033* (2015.10); *A61H 2003/006* (2013.01); *A61H 2201/1261* (2013.01); *A61H 2201/1635* (2013.01); *A63B 3/00* (2013.01); *A63B 2022/0094* (2013.01)

(58) Field of Classification Search
CPC ........ A61H 3/04; A61H 3/00; A63B 21/4035; A63B 21/00; A63B 2022/0094
See application file for complete search history.

(56) References Cited

U.S. PATENT DOCUMENTS 9,022,909 B2 * 5/2015 Kermath ............ A63B 22/0089 482/133
9,795,825 B2 * 10/2017 Johnson .................. A61H 3/04
10,617,907 B2 * 4/2020 Johnson ............ A63B 21/4045

* cited by examiner

*Primary Examiner* — Amy J. Sterling
(74) *Attorney, Agent, or Firm* — Fay Sharpe LLP

(57) ABSTRACT

A patient aid assembly for a railed device having first and second associated rails in parallel relation, and an interconnecting member joining first and second mobile upper extremity support assemblies.

27 Claims, 11 Drawing Sheets

MOBILE UPPER EXTREMITY (UE) SUPPORTS FOR USE IN RAILED ENVIRONMENTS

This application claims the priority benefit of and is a continuation-in-part application of U.S. Ser. No. 15/835,062, filed Dec. 7, 2017 (now allowed), which claimed the priority benefit of U.S. provisional Application Ser. No. 62/431,131, filed Dec. 7, 2016; and this application claims the priority benefit of and is also a continuation-in-part of U.S. application Ser. No. 15/790,827, filed Oct. 23, 2017 (now allowed), which is a continuation of U.S. Ser. No. 14/719,311, filed May 21, 2015 (now U.S. Pat. No. 9,795,825), which claims the priority benefit of U.S. provisional application Ser. No. 62/001,353, filed May 21, 2014, Ser. No. 62/043,807, filed Aug. 29, 2014, and Ser. No. 62/091,191, filed Dec. 12, 2014; and U.S. Ser. No. 15/835,062 also claims priority from and is a continuation-in-part of U.S. Ser. No. 15/970,538, filed May 3, 2018 (now U.S. Pat. No. 10,543,144) which was a submission under 35 U.S.C. 371 of international application Serial No. PCT/US2016/060411, filed Nov. 3, 2016, and which claims the priority benefit of U.S. provisional application Ser. No. 62/250,291, filed Nov. 3, 2015. The entire disclosures of each of these applications and issued patents is expressly incorporated herein by reference.

BACKGROUND OF THE INVENTION

This disclosure is directed to assistive device technologies which are accessories for railed devices used for rehabilitation and exercise, such as single rail devices, parallel bars, hemiplegic bars, treadmills, walkers, and the like. In particular, accessories which are related to upper extremity (UE) support and movement can be used for gait rehabilitation, ambulation activities, balance and coordination training, conditioning and strengthening and other therapeutic activities as well as for upper body rehabilitation and exercise.

DETAILED DESCRIPTIONS

Three types of interconnecting members are presented which enable reciprocating, out of phase, or alternating arm movement while standing, marching in place, or walking within two rails of a railed device.

Figure 1:
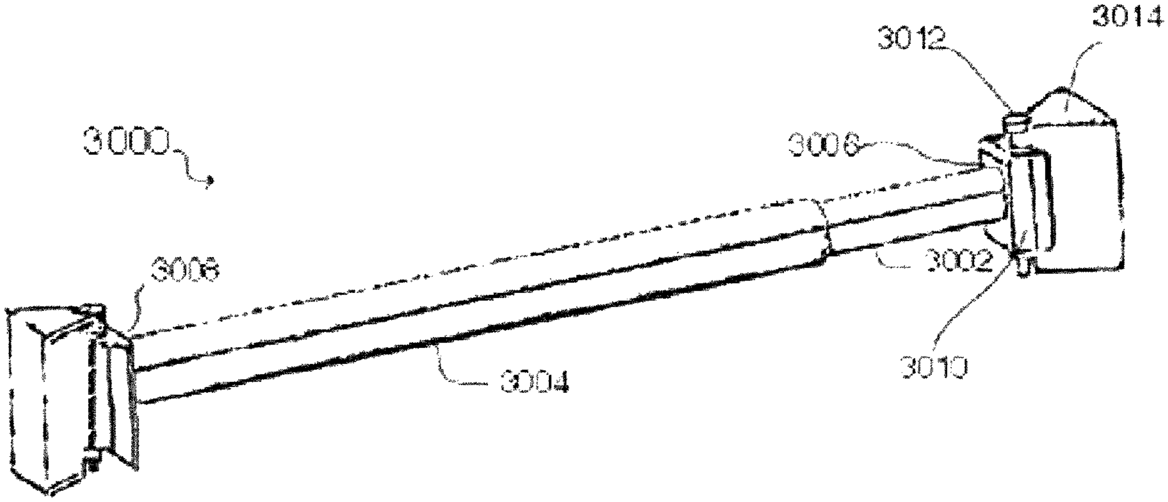
FIG. 1 is a telescoping interconnecting assembly. This assembly variably can house a spring (compression or extension) or not house a spring.

A telescoping straight bar interconnecting member 3000 shown in FIG. 1 is comprised of a smaller diameter tube 3002 which slides within a larger diameter tube 3004. Tubes, for instance, can be made out of aluminum or rigid plastic or other material. The lengths of the tubes are sufficiently long to enable variable width settings of parallel rails, and for allowing longitudinal displacement of mobile assemblies mounted on first and second rails positioned in parallel relation. The outermost/exposed end of each of the smaller and larger diameter tubes, 3006 and 3008 respectively, is mounted onto a plate 3010 which is pivotally mounted by a hinge pin 3012 onto a three-sided mounting member 3014. First and second mounting members are configured for mounting onto each of first and second housings. Tube diameters and housing mounts are of sufficient size and stability to provide rotational stabilization to the mobile housings. A spring is placed inside of the two sliding tubes. The spring can be a compression spring or an extension spring. The amount of force needed to push/pull assemblies depends on the physical characteristics of the spring, as well as resistance to glide of the housing along the rails. Variably, no spring is placed within the tubes.

Without a spring assembly housed in the tubes, the telescoping interconnecting member enables longitudinal displacement of one assembly relative to the second assembly, by provision of a mechanism to increase the distance between hinged connection points.

A compression spring pushes the tubes part. In terms of walking forward in parallel bars with a bilateral support assembly with a compression spring in the telescoping interconnecting member, this type of spring facilitates forward movement of the upper extremity of the user from a position symmetrical with the opposite support assembly. For stationary activities, movement of one arm forward concurrent with movement of one arm backward (reciprocating arm movement) is facilitated, and movement would be symmetrical without a differential in amount of resistance to movement exerted by the user.

A spring is placed within the tubes and spacers are added to adjust the amount of compression. There are two stable positions of the two sliders/mobile housings associated with this spring: left housing full forward and right housing full back, or vice versa. From either position, the user needs to pull and/or push on one or both of the mobile support assemblies until they are directly opposite each other. In this position, the spring is maximally compressed for a given spacing of two parallel rails. This mobile bilateral upper extremity support assembly can be used to enable symmetrical, out of phase upper extremity motion in front of and behind the frontal plane of the body while the user is standing or marching in place, or while walking within the rails. Reciprocating, out of phase arm movement occurs, and each mobile assembly repetitively moves forward and backward, with overall progression in the direction the user is walking. In the presence of a strong spring and/or large excursion distance capability of the tubular components, the user may elect to exert control over the fore/aft movement of the lengthening spring. It can also be used to alternatingly advance the mobile support assemblies. For walking forward, this can be accomplished by statically positioning one assembly in a neutral position (by user's side) with the use of a hand brake, or otherwise maintaining fairly constant positioning of the mobile assembly once the assembly is advanced, and allowing the second assembly to advance forward (or backward, if walking backward) with or without variable active restraint of movement of the assembly by the user. The second assembly is thereafter statically positioned (actively held in place or braked) and the first assembly is pushed forward, which compresses the spring, to the point at which the assemblies are symmetrically positioned, and then additional forward movement for placing the assembly in front of the user is accomplished by allowing the support assembly to snap forward, or to advance more slowly via variable active resistance to glide as the spring extends. Incorporation of this type of spring serves to facilitate advancing an assembly forward from a position of symmetry with the opposite assembly, as well as facilitate equal and opposite movement of the assemblies to forward and backward positions. During sequential placement of the assemblies, each assembly roughly travels the length of the rails. In terms of forward walking: arm movement from a forward position, rearwardly toward the body occurs as the body advances on the fixed arm.

An extension spring pulls the tubes together in another arrangement. The ends are attached to the inside ends of both tubes. The stable position is when the mobile housings are directly opposite each other. From this position, the user needs to push/pull one or both of the mobile support assemblies to the fore/aft positions. As with the compression spring, the user can alternatingly advance the assemblies along respective rails while walking within the rails or can move the upper extremities back and forth, concurrent with walking. From a neutral position, with the support assemblies symmetrically positioned at the sides of the user, the user brakes or otherwise statically positions the first assembly in neutral position, then pushes the second assembly forward and uses the hand brake to statically position or variably maintains the assembly stationary to the extent desired. The first assembly is allowed to advance to the stable position (symmetrical housings), and then the user pushes it forward to the forward position. Incorporation of this type of spring facilitates to advance a lagging assembly up to a symmetrical position with the more advanced assembly. The cycle is then repeated. The user can also move the upper extremities (supported on mobile upper extremity support assemblies) in reciprocating fashion, forward and backward, in front of and behind the body, concurrent with walking or while standing/marching in place.

Figure 2A:
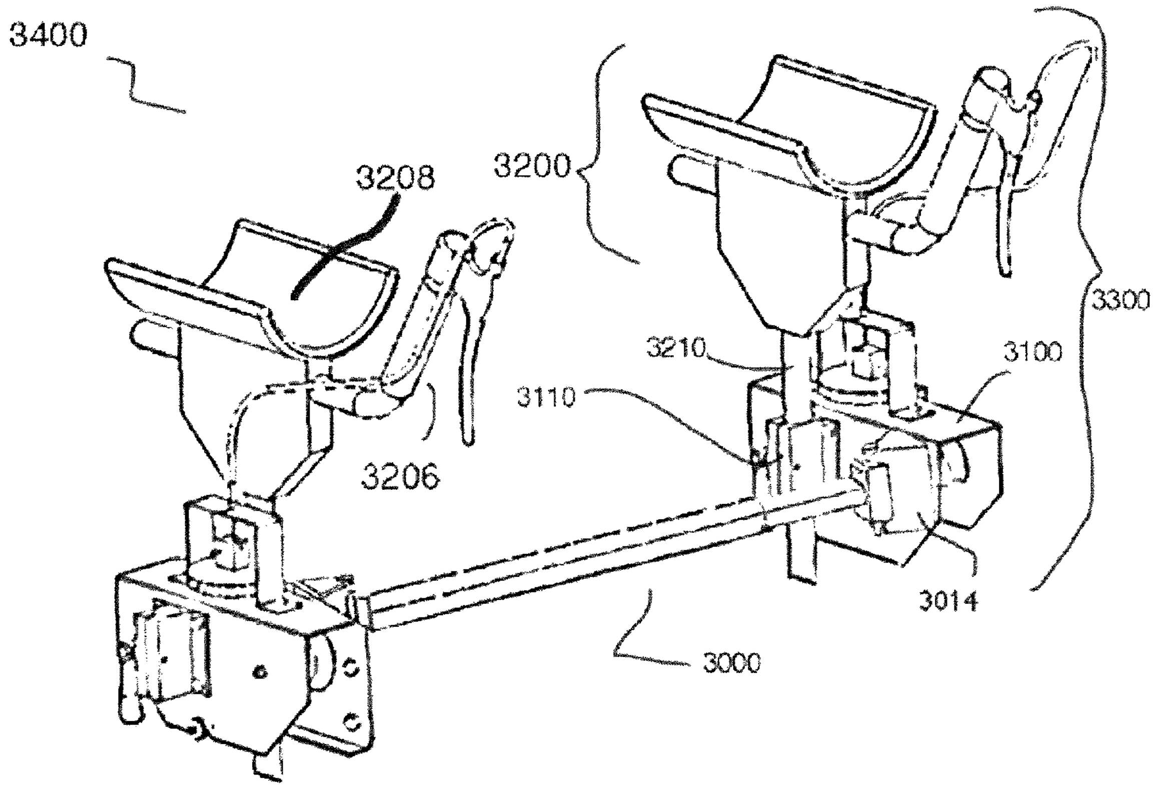
FIG. 2A is a mobile bilateral upper extremity support assembly with two forearm support assemblies mounted on each of first and second symmetrically positioned housings. A telescoping interconnecting member connects the two housings.

In FIG. 2A, mobile housings 3100 are positioned symmetrically. Telescoping interconnecting member 3000 is in place between the housings. Mounting members 3014 are secured medially on housings. A forearm support assembly 3200 is mounted on each of the two housings by securing mounting tube 3210 into tube clevis 3110 to create a mobile upper extremity support assembly 3300. Forearm trough component shown as 3208 and grip handle is identified as 3206. This is simply one example of support assembly (and associated mounting method) design. Two mobile support assemblies and the interconnecting telescoping linkage create a bilateral assembly 3400.

Figure 2B:
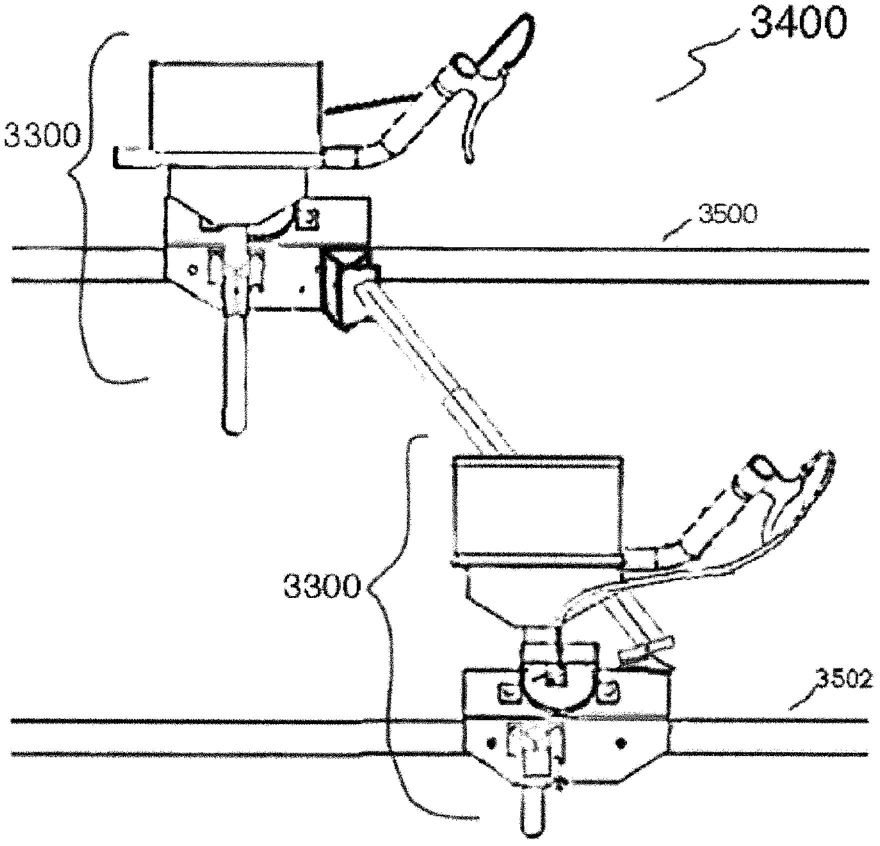
FIG. 2B is the assembly in FIG. 2A shown mounted on parallel rails, with asymmetrically positioned housings.

In FIG. 2B, bilateral assembly 3400 is shown asymmetrically positioned on rails 3500 and 3502. The allowable longitudinal distance (fore/aft longitudinally along rails, or straight line connecting distance between similar locations on housings) between mobile assemblies can be altered by blocking degrees of rotation of the hinge plate on the telescoping assembly mounting member, on one or both housings. Maximum allowable displacement between assemblies is also dependent on the length of the tubes and selected width between rails, and length and tensile properties of the spring. Reciprocating gait patterns are performed as the opposite lower extremity is advanced simultaneously with the opposite upper extremity, or is advanced following advancing and placing the opposite upper extremity support assembly along the rail.

Figure 3:
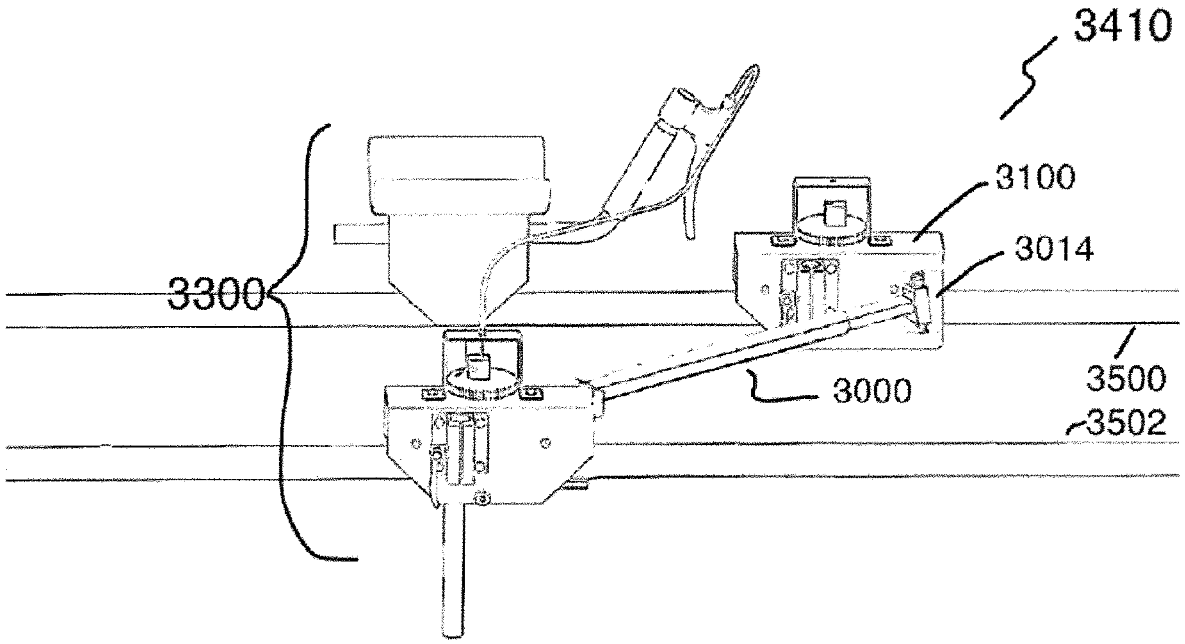
FIG. 3 is an assembly with two housings asymmetrically mounted on rails connected by a telescoping interconnecting member. A forearm support assembly is mounted on one housing and no upper extremity support assembly is mounted on the second housing.

In FIG. 3, a mobile support assembly 3300 is connected to mobile housing 3100 by telescoping interconnecting member assembly 3000 which includes associated housing mounts, 3014. Housings are mounted on rails 3500 and 3502. Preferrably, hinge connections on one or both housings are locked in static position. This serves to maintain selected distance between assemblies. This embodiment provides for unilateral upper extremity. The user can stand, march in place, or walk with one forearm supported.

Figure 4:
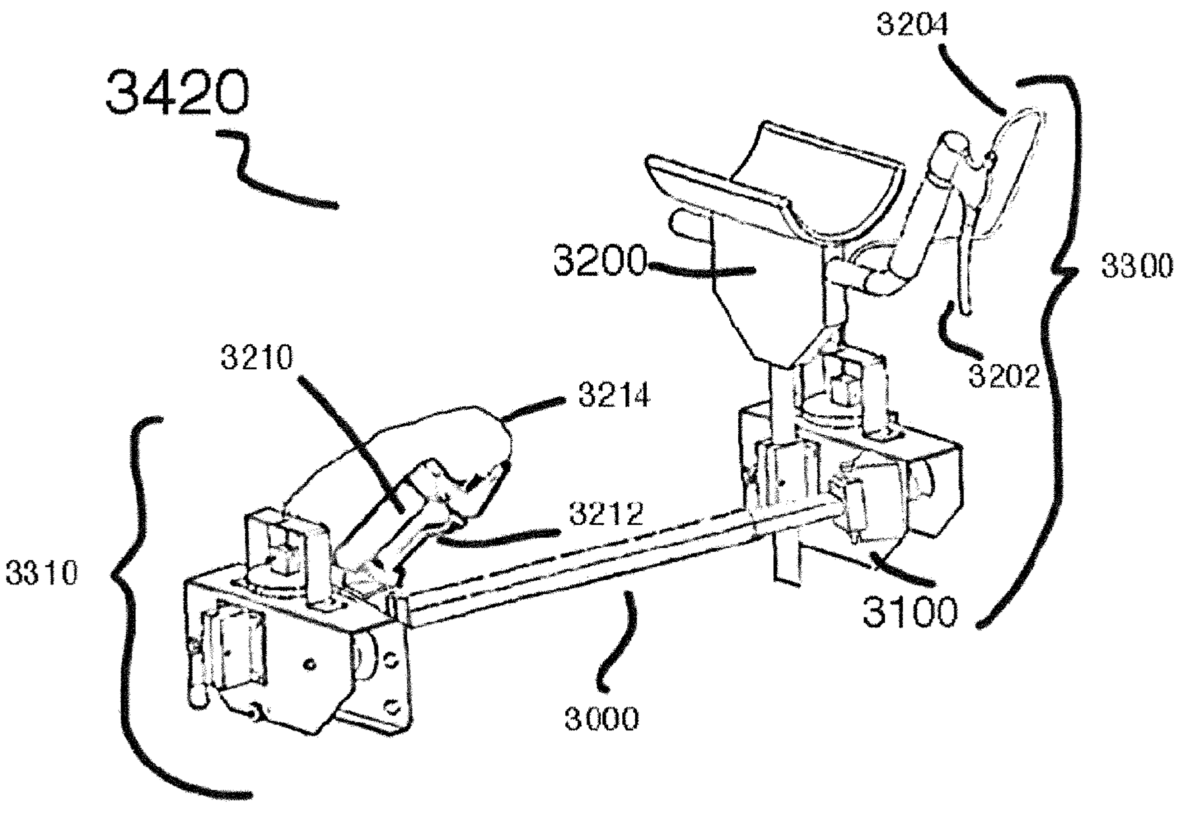
FIG. 4 is the assembly in FIG. 2A with a grip handle support assembly mounted on the first housing instead of a forearm support assembly.

In FIG. 4, mobile housing 3100 with attached grip handle assembly 3210 creates a mobile grip handle assembly 3310. Telescoping linkage assembly 3000 interconnects mobile grip handle assembly 3310 and mobile forearm support assembly 3300 to create a bilateral assembly 3420. A grip handle assembly 3210 is mounted onto mobile housing 3100 by mounting the tube into the tube clevis on the medial side of housing as was done with forearm support assembly on opposite rail. Grip handle assembly and forearm support assembly are both shown with brake levers and associated brake cables 3212 and 3214 and 3202 and 3204, respectively. Braking provides for adjusting resistance to glide as well as for static positioning of housings.

Figure 5:
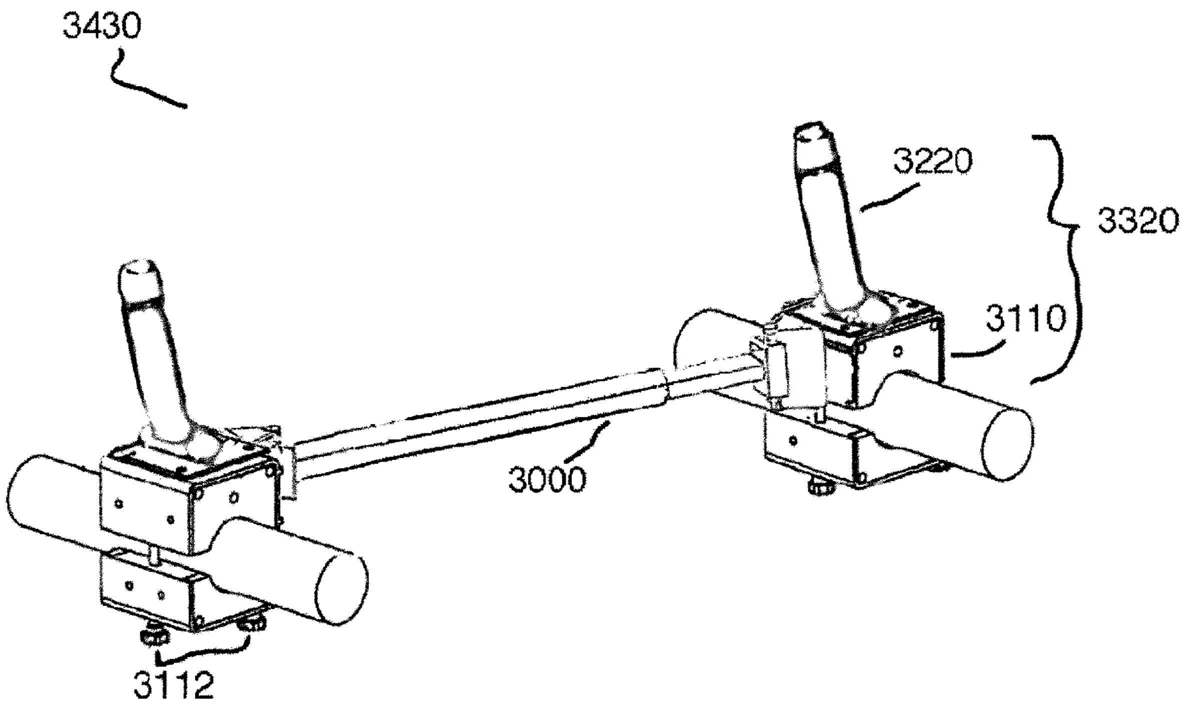
FIG. 5 is an assembly with two grip handles without hand brakes mounted on first and second housings with a different design compared to housings shown in FIGS. 2-4. A telescoping interconnecting member connects the two housings, and housings are shown mounted on parallel rails.

In FIG. 5, telescoping interconnecting member assembly 3000 is shown secured in place between a different type of mobile housing 3110, one on each rail. Resistance to glide is altered by adjusting fasteners 3112 on underside of housings. Grip handles 3220 are shown mounted on the housings to create mobile grip assemblies 3320. Bilateral assembly is represented by 3430. There are no brake levers associated with this design.

Figure 6:
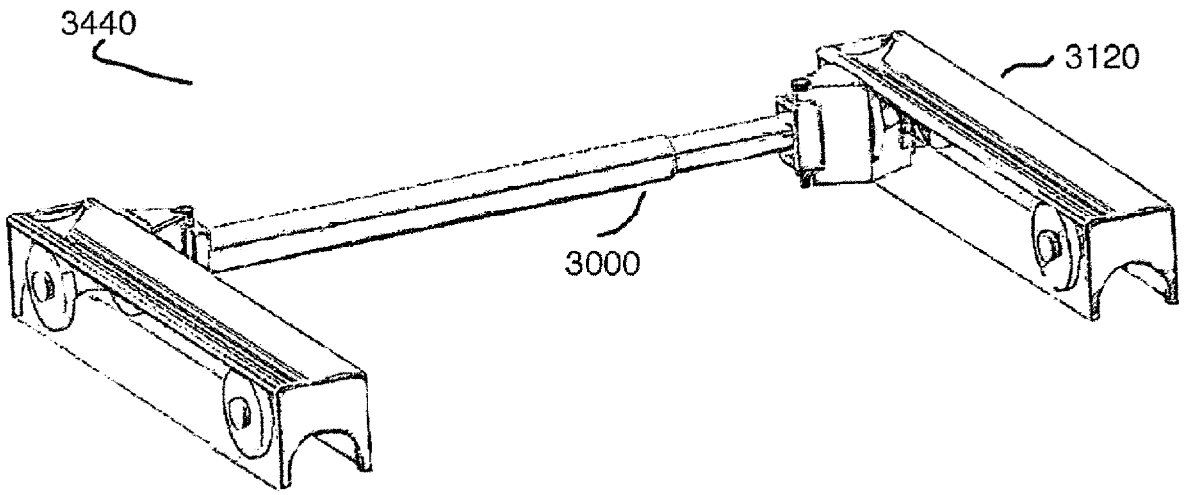
FIG. 6 is an assembly with mobile housings which support forearms of an associated user, and a telescoping interconnecting member.

Mobile housing 3120 has forearm support surfaces integrated into the housing design in FIG. 6. Grip handles could favorably be secured to the front ends for gripping by the user. Rail heights would be raised to accommodate housings supporting the forearms of the user. Two housings 3120 are shown connected with a telescoping linkage assembly 3000 to create a bilateral assembly 3440.

Figure 7A:
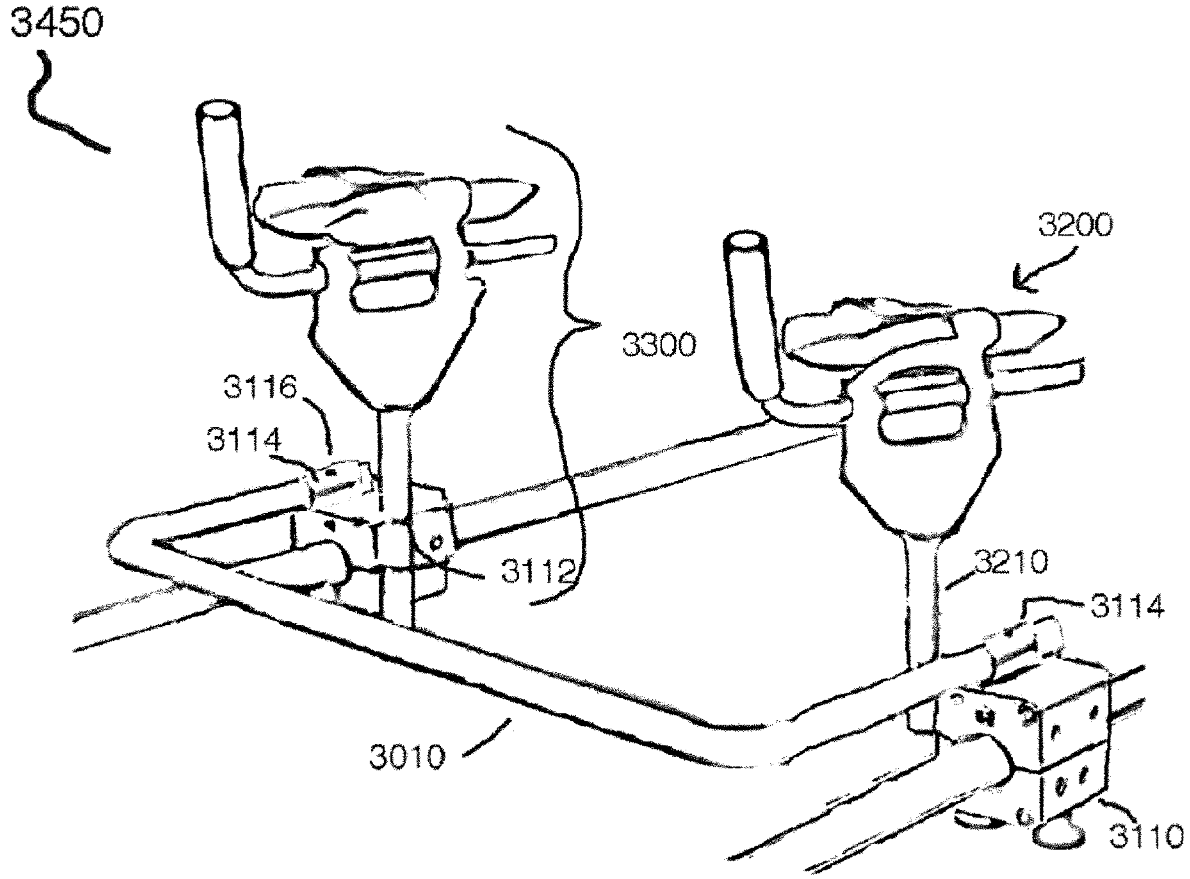
FIG. 7A is an assembly with two forearm support assemblies mounted on first and second symmetrically positioned housings which have been mounted on parallel rails, respectively. Each side of a rigid interconnecting member is pivotally connected to a respective one of the two housings.
Figure 7B:
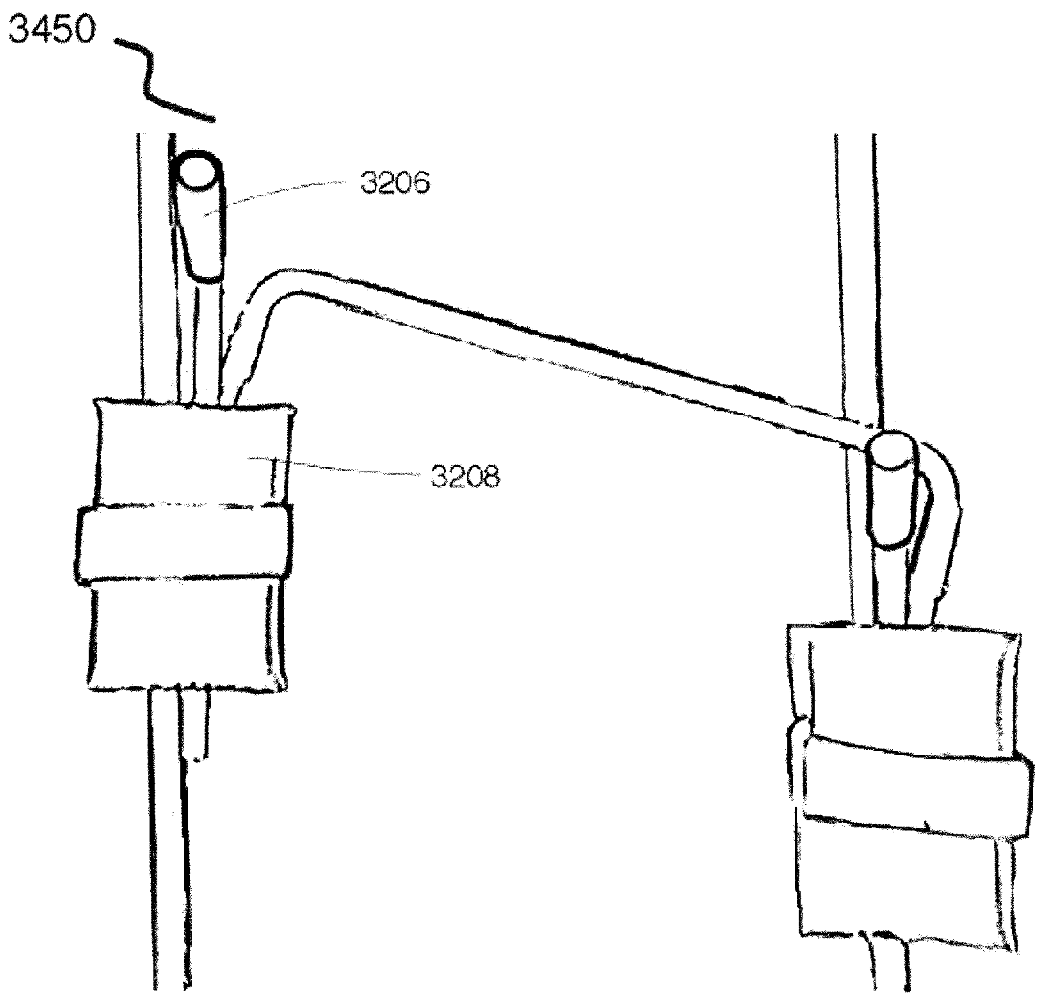
FIG. 7B is a bird's eye view of the assembly in FIG. 5A, with first and second mobile upper extremity support assemblies asymmetrically positioned on first and second rails. This is enabled by the mobile pivotal connections of the interconnecting member with each of first and second housings.

A different type of interconnecting member enabling reciprocating arm movement (out of phase, back and forth arm movement while standing/marching in place or concurrent with walking, or alternating placement of upper extremity support assemblies while walking forward or backward within parallel bars) is shown in FIGS. 7A and 7B. The linkage is rigid with two pivoting connections. Mobile housings 3110 are mounted on parallel rails. Forearm support assemblies 3200 are mounted onto mobile housings to create mobile support assemblies 3300 by securing vertical tube 3210 into tube clevis 3112. Ends of a rigid interconnecting member 3010 are secured in tube clevises 3114, one on each housing. Tube clevises are secured to housings by hinge pins 3116 which enable pivoting motion of the clevises. Bilateral assembly is identified as 3450.

When pivotal connections on assembly 3450 are allowed to be mobile, one or both mobile upper extremity support assemblies 3300 can move relative to the other in a longitudinal direction, as shown in FIG. 7B. Forearm trough 3208 and grip handle component of forearm support assembly 3206 are shown. The rigid interconnecting member is rotated to the right in this illustration. An increase in the linear distance between symmetrical landmarks on the housings compared to the distance between points when housings are symmetrically positioned is enabled by the rotation of the nonlinear connecting member. From the position of the assemblies shown in FIG. 7B, for forward walking, the user would move the assembly on the right forward and past the assembly on the left rail. Variably, the user could move the left assembly in a reverse direction concurrent with moving the right assembly forward, and then vice versa, all concurrent with walking forward or marching in place. Movement of one assembly causes movement of the second assembly only when the maximum distance between assemblies limited by the linkage is reached and maintained, and the user moves forward or backward.

Figure 8A:
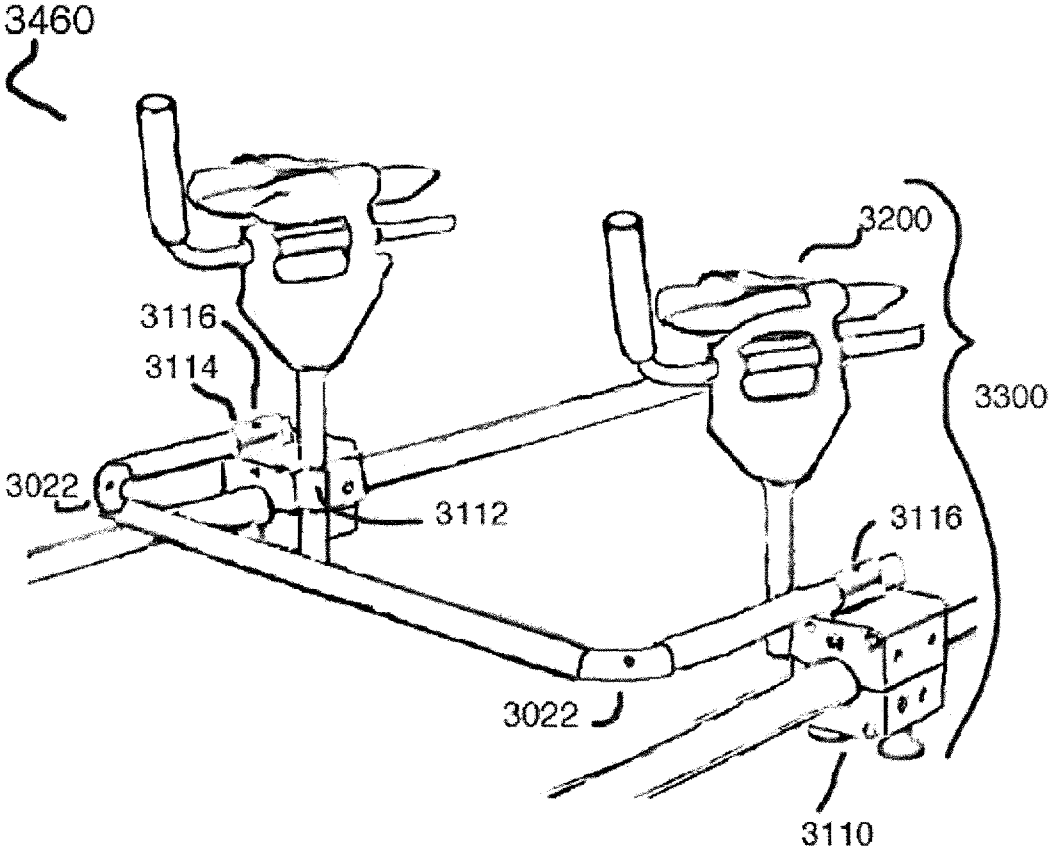
FIG. 8A is an assembly with two forearm support assemblies each mounted on first and second symmetrically positioned housings mounted on parallel rails. The ends of the rigid interconnecting member are mounted with hinge pins on housings. A hinge is located at each of two corners of a U-shaped interconnecting member.
Figure 8B:
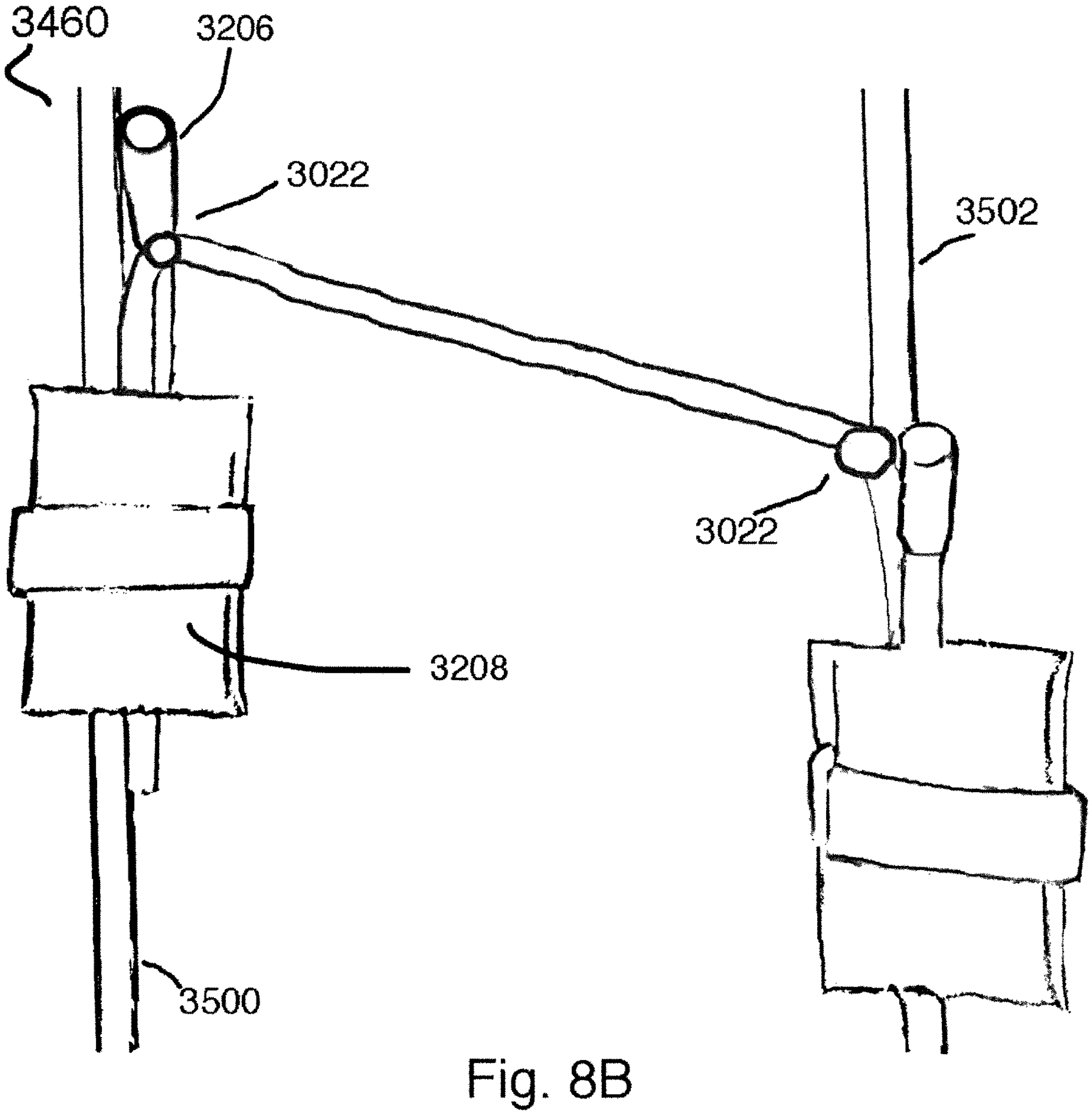
FIG. 8B is a bird's eye view of FIG. 8A with assemblies asymmetrically positioned on rails.

In FIGS. 8A and 8B, an alternate interconnecting member design is shown. Bilateral assembly 3460 is shown and is comprised of mobile forearm support assemblies 3300 and an interconnecting member 3020 with hinges 3022 at the corners. Tube clevis attachments 3114 are pivotally connected to housings. FIG. 8B shows asymmetrically positioned assemblies from an overhead or bird's eye view. Forearm trough 3208 and grip handle component 3206 of forearm support assembly are shown. Movement of one or both mobile assemblies to create asymmetrical positioning on rails in a longitudinal direction is enabled due to movement in the hinges 3022 at the corners and pivoting movement of tube clevis attachments to housings.

I claim:

1. An assembly for a railed device having first and second associated rails in parallel relation, the assembly comprising:

first and second mobile housings configured for slidingly engaging the associated first and second rails, respectively;

at least one of first and second upper extremity support assemblies operatively associated with one of first and second mobile housings, respectively, providing at least one of first and second mobile upper extremity support assemblies, for supporting at least one upper extremity of an associated user while the associated user is positioned between the associated first and second rails and allowing movement of at least one of first and second upper extremities of the associated user relative to the respective rail, and allowing movement of the associated user relative to the rails in a longitudinal direction generally parallel to the rails; and an interconnecting member situated in a horizontal plane and positioned between the mobile upper extremity support assemblies and having first and second hinge/pivotal connections to the first and second assemblies that enable rotation of first and second distal ends of the interconnecting member relative to the first and second mobile upper extremity assemblies in the horizontal plane in order to move at least one of the mobile first and second upper extremity support assemblies relative to the associated user and to the other of the mobile first and second upper extremity support assemblies.

2. The assembly of claim 1 wherein the interconnecting member includes first and second telescoping tubes.

3. The assembly of claim 2 wherein the interconnecting member includes a spring therein.

4. The assembly of claim 3 wherein the spring is a compression spring for either (a) alternating placement along the associated rails, or for (b) reciprocating, out of phase upper extremity movement when an associated user is standing or walking.

5. The assembly of claim 4 wherein a first mobile assembly is advanced in a longitudinal direction past a second assembly and the second assembly is then advanced a symmetrical distance past the first assembly.

6. The assembly of claim 4 wherein the first and second mobile upper extremity assemblies move equally in opposite directions on the associated first and second rails respectively.

7. The assembly of claim 2 wherein the interconnecting member does not include a spring therein.

8. The assembly of claim 1 wherein movement of at least one of first and second pivotal/hinge connections between first and second ends of the interconnecting member and first and second mobile upper extremity support assemblies respectively can be disenabled by a locking mechanism.

9. The assembly of claim 1 wherein at least one of the first and second mobile upper extremity support assemblies includes a braking mechanism for braking movement of at least one of first and second mobile upper extremity assemblies along the respective rail.

10. The assembly of claim 1 further comprising at least one of first and second variable resistance members for selectively altering resistance to sliding movement of at least one of first and second mobile upper extremity support assemblies relative to at least one of the associated first and second rails, respectively.

11. The assembly of claim 1 wherein at least one of the first and second housings includes at least one wheel that is configured for slidingly engaging the first associated rail.

12. The assembly of claim 1 wherein at least one of first and second housings has an arcuate surface that conforms to at least a portion of the perimeter of the associated first rail.

13. The assembly of claim 1 further comprising one of either a forearm support assembly or a gripping hand support assembly on at least one of the first and second mobile upper extremity support assemblies.

14. An assembly for an associated railed device for ambulatory use by an associated user, the associated railed device having first and second associated horizontal rails in parallel relation positioned on a horizontal plane, the assembly comprising:

first and second mobile upper extremity support assemblies, each configured for attaching to and for slidingly engaging the associated first and second rails, respectively, and each configured for supporting at least a portion of an upper extremity of an associated user when a torso of the associated user is in an upright position, each mobile upper extremity support assembly allowing movement of an upper extremity of the associated user relative to the respective rail therealong in a longitudinal direction when the associated user is standing or walking between the associated rails and allowing walking movement of the associated user relative to the rails in the longitudinal direction parallel to the rails when both upper extremities of the associated user are supported and feet of an associated user are positioned between the associated rails; and an interconnecting member joining the first and second mobile upper extremity support assemblies and configured to enable the first mobile upper extremity support assembly to be advanced in a first longitudinal direction beyond the position of the second mobile upper extremity support assembly, and the second mobile upper extremity support assembly to then be advanced in a second longitudinal direction beyond the position of the first mobile upper extremity support assembly as the associated body of the associated user moves in a longitudinal direction generally parallel to and relative to the rails.

15. The assembly of claim 14 wherein at least one of the first and second mobile upper extremity support assemblies includes a braking mechanism for braking movement of at least one of first and second mobile upper extremity assemblies along the respective rail.

16. The assembly of claim 14 further comprising at least one of first and second variable resistance members for selectively altering resistance to sliding movement of at least one of the first and second mobile upper extremity support assemblies relative to at least one of first and second rails, respectively.

17. A patient aid assembly for ambulatory use with an associated railed device having first and second horizontal and parallel rails extending in a longitudinal direction, the patient aid assembly comprising:

first and second housings, the first housing slidingly engaging the first rail, and the second housing slidingly engaging the second rail;

first and second upper extremity support assemblies operatively associated with the first and second housings to create first and second mobile upper extremity support assemblies, allowing movement of first and second upper extremities of an associated user relative to the respective rails therealong in the longitudinal direction when the associated user is between the rails with upright posture and allowing movement of the associated user relative to the rails in the longitudinal direction parallel to the rails; and an interconnecting member positioned between the first and second mobile upper extremity support assemblies and configured to allow change in linear distance between the mobile upper extremity support assemblies as a first upper extremity of the associated user changes position relative to a second upper extremity and relative to the associated body of the associated user.

18. The assembly of claim 17 wherein the interconnecting member allows an increase in longitudinal distance between the first and second upper extremity support assemblies.

19. The assembly of claim 17 wherein the interconnecting member allows a decrease in longitudinal distance between first and second upper extremity support assemblies.

20. The assembly of claim 17 wherein at least one of first and second upper extremity support assemblies includes a braking mechanism for braking movement of the at least one of first and second upper extremity support assemblies along the respective rail.

21. The assembly of claim 17 wherein first and second upper extremity support assemblies move in opposite directions relative to the associated user enabling reciprocating arm movement.

22. An assembly for an associated railed device having first and second associated rails in parallel relation, the assembly comprising:

first and second mobile housings configured for slidingly engaging the associated first and second rails, respectively;

a first upper extremity support assembly operatively associated with the first mobile housing and a second upper extremity support assembly operatively associated with the second mobile housing, creating first and second mobile upper extremity support assemblies configured to support at least a portion of first and second mobile upper extremity support assemblies respectively of an associated user while the associated user is positioned in a standing, upright position between the associated first and second rails, and enabling movement of the first and second supported upper extremities of the associated user relative to the respective rails in a longitudinal direction generally parallel to the associated rails; and an interconnecting member situated in a horizontal plane and positioned between the first and second mobile housings, and having at least first and second hinge/pivotal connections for connecting the interconnecting member with the first and second mobile housings, respectively, to enable rotation in the horizontal plane of the interconnecting member relative to the respective mobile housing in order to enable movement of the first mobile housing relative to the second mobile housing as the associated user stands or walks between the rails.

23. The assembly of claim 22 wherein the interconnecting member is formed of first and second interconnecting portions, and a third hinge/pivotal connection interconnects the first and second interconnecting portions.

24. The assembly of claim 22 wherein movement of at least one of the first and second pivotal/hinge connections of the interconnecting member can be disenabled by a locking mechanism.

25. The assembly of claim 22 wherein at least one of the first and second mobile upper extremity support assemblies includes a braking mechanism for braking movement of at least one of first and second mobile upper extremity assemblies along the respective associated rail.

26. The assembly of claim 22 further comprising a variable resistance member operatively associated with at least one of the first and second upper extremity support assemblies for selectively altering resistance thereof to sliding movement relative to the respective rail.

27. The assembly of claim 23 further comprising one of either a forearm support assembly or a gripping hand support assembly on at least one of the first and second mobile upper extremity support assemblies.

* * * * *